United States Patent Office 3,567,703
Patented Mar. 2, 1971

3,567,703
METHOD OF PRODUCING STRAIGHT CHAIN WAXES BY CATALYTIC POLYMERIZATION OF ETHYLENE
Gert G. Eberhardt, Philadelphia, Pa., assignor to Sun Oil Company, Philadelphia, Pa.
No Drawing. Continuation-in-part of application Ser. No. 279,341, May 9, 1963. This application Feb. 27, 1969, Ser. No. 803,082
Int. Cl. C08f 1/76, 3/06
U.S. Cl. 260—94.9     19 Claims

ABSTRACT OF THE DISCLOSURE

Polyethylene waxes with molecular weights of 1000–3000 and melting points of 100–125° C. are made by polymerizing ethylene at 101–150° C. employing a catalyst prepared by combining LiR with a non-aromatic tertiary amine which contains bridgehead nitrogen or which is a chelating diamine. The products have utility in paper coating compositions, floor polishes and the like.

---

This application is a continuation-in-part of my copending application Ser. No. 279,341, filed May 9, 1963 now abandoned.

This invention relates to the catalytic polymerization of ethylene to produce waxes. The wax products prepared according to the invention are straight chain terminal olefins having molecular weights mainly within the range of 1000–3000. These waxes generally melt in the range of 100–125° C., have a low melt viscosity and hence are particularly useful as coating compositions for paper products such as drinking cups, as components of floor polishes and the like.

Numerous procedures are known for polymerizing ethylene and products ranging from low molecular weight liquid polymers to high molecular weight polyethylene resins have been made. Of the known procedures which are capable of producing ethylene polymers of intermediate molecular weight, such as greases and waxes, most yield products which a relatively wide molecular weight distribution range.

The present invention provides a method for polymerizing ethylene and producing waxes which have a relatively narrow molecular weight distribution. A preponderant proportion of the polymers prepared acording to the invention have average molecular weights in the range of 1000–3000 and melting points in the range of 100–125° C.

In accordance with the invention polyethylene wax is prepared by contacting ethylene at a temperature in the range of 101–150° C. with an inert liquid reaction medium containing a catalyst prepared by combining a non-aromatic tertiary amine with LiR wherein R is a hydrocarbon radical having 1–30 carbon atoms selected from the group consisting of alkyl, cycloalkyl, aryl, aralkyl and alkenyl. I have now found that such catalyst in conjunction with reaction temperatures above 100° C. will cause ethylene to polymerize to straight chain terminal olefins that have molecular weights in the range of 1000–3000. Only a minor amount of lower or higher polymers are produced in the process.

As a specific example of the invention, lithium butyl is dissolved in a saturated hydrocarbon solvent, e.g., hexane, in a concentration of two grams per liter and a chelating diamine, such as N,N'-tetramethylethylene diamine, is added in amount of at least one mole per mole of lithium butyl. The mixture is contacted at 115° C. with ethylene at a pressure of 800 p.s.i.g. Thereafter the mixture is worked up to recover the polymer, whereby polyethylene wax having an average molecular weight of the order of 1900 as determined by intrinsic viscosity is obtained.

The catalyst for practicing the present process can be formed in situ in the reaction medium prior to contacting it with the ethylene or it can be separately pre-formed and subsequently added to the reaction medium. The reaction medium preferably is a saturated liquid hydrocarbon which can be either parafinic or naphthenic or both. A mixture of saturated hydrocarbons, such as the saturate fraction of naphtha or isobutane-butylene alkylate, can be employed. As previously indicated, the essential ingredients of the catalyst are a hydrocarbyl lithium compound having 1–30 carbon atoms and a non-aromatic tertiary amine. These components when admixed form coordination compounds which are the active catalyst species. The R group of the lithium compound can be any hydrocarbon radical of the specified number of carbon atoms including aliphatic, cycloaliphatic, aryl, alkaryl and alkenyl groups. The following are examples of suitable R groups for the LiR component: ethyl, propyl, isopropyl, n-butyl, isobutyl, tertiary butyl, n-amyl, isoamyl, n- or isooctyl, n- or isodecyl, lauryl, cyclopentyl, methylcyclohexyl, phenyl, benzyl, tolyl, xylyl, cumyl, methylbenzyl, propylbenzyl, 2-phenylethyl, allyl, crotonyl and the like. Preferably LiR is an alkyl lithium in which the alkyl group has 2–10 carbon atoms.

The amine component of the catalyst system can be any non-aromatic tertiary amine which is a chelating diamine or an amine that contains bridgehead nitrogen. Any amine of either type will form a coordination complex with the hydrocarbyl lithium component and thereby form a cataylst system that is effective for polymerizing ethylene. Best results generally are obtained with chelating diamines, i.e., diamines in which the two nitrogen atoms are so spaced in the molecule that the diamine can form a chelate with the lithium component of the catalyst. These chelating amines can be of either of two sub-types depending upon whether the molecular structure is flexible or rigid. Examples of the flexible sub-type are as follows: N,N'-tetramethylethylene diamine and N,N'-tetrapropylethylene diamine. The following are examples of the rigid sub-type in which the nitrogen atoms are so positioned with respect to each other that metal chelates can readily be formed in spite of the lack of flexibility in the molecular structure:

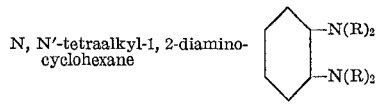

N, N'-tetraalkyl-1, 2-diamino-cyclohexane

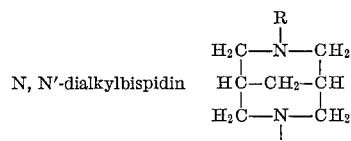

N, N'-dialkylbispidin

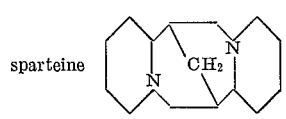

sparteine

Chelates formed from diamines of the latter sub-type have particularly good stability and high catalytic activity.

The non-chelating type of amine which can be used in practicing the invention comprises amines in which at least one nitrogen atom is located at a bridgehead position, by which is meant that all three valences of the nitrogen participate in ring systems. The preferred amine of this type is triethylene diamine, which also can be designated 1,4-diaza[2.2.2]bicyclooctane, which has the following structure:

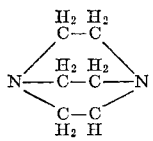

Any bridgehead type amines will form coordination complexes with the LiR component that have good catalytic activity and stability. Another amine of the bridgehead type is quinuclidine or 1,4 - ethylenepiperidine, which has a structure like the foregoing except that one of the nitrogen atoms is replaced by a CH group. Still other examples are the aza-adamantanes which structurally resemble adamantane except that one or more nitrogen atoms are substituted at bridgehead positions in place of carbon.

The alkaloid sparteine, the formula of which is shown above, is an example of a suitable amine which is both a chelating diamine and a bridgehead amine.

The proportion of the tertiary amine to the lithium compound incorporated in the reaction mixture can vary widely. For example, the amounts of these catalyst components used can be such that the atomic ratio of nitrogen to lithium (N:Li) in the catalyst system varies from 0.1:1 to 100:1. In fact the amine can be used as the reaction medium or solvent in place of a saturated hydrocarbon, although this generally is not desirable because of its relatively high cost. A more desirable range of atomic ratios of N:Li within which to operate is from 0.5:1 to 20:1 and it is preferable to employ the amine in at least the stoichiometric amount for forming its coordination complex with the LiR component. For chelating amines of the molecularly rigid sub-type little if any advantage is gained by using more than the stoichiometric amount. However for other types of amines better catalyst activity and longer life often can be obtained by utilizing a substantial excess of the amine relative to the lithium component, for example, 5–10 times the stoichiometric amount required for forming the coordination complex. As a usual rule, the best proportions to use of amine to LiR will correspond to atomic ratios of N:Li within the range of 2:1 to 30:1.

In effecting the polymerization reaction ethylene is contacted with the reaction medium containing the catalyst prepared as described above. The reaction temperature should be in the range of 101–150° C. and more preferably 101–130° C. The reaction proceeds slowly if the ethylene is at atmospheric pressure and the reaction rate increases as the pressure is increased. Hence it is desirable to use a pressure in excess of 50 p.s.i.g. and considerably higher pressures can be used if desired, for example, 500–2000 p.s.i.g. or even much higher pressures such as 20,000 p.s.i.g. The reactor should be provided with agitation means for effecting intimate contact between the ethylene phase and the liquid reaction medium. Ethylene can be added to the reactor continuously or intermittently as it is consumed to maintain the pressure at about the desired level.

Precautions should be taken to exclude air and moisture from the reaction system to avoid poisoning of the catalyst. Hydrogen also acts as a catalyst poison and hence the ethylene used should not contain free hydrogen.

As the ploymerization reaction proceeds the activity of the catalyst tends to decrease and eventually will reach a low enough level that it is no longer feasible to continue the reaction. The catalyst then can be completely deactivated by contacting the mixture with water. This will break the catalyst complex, releasing the amine and converting the lithium into lithium hydroxide. The latter will dissolve in the water phase and can be removed therewith. In cases where a water-soluble amine was used to form the catalyst, the amine will also dissolve in the water phase and can be recovered therefrom by distillation. For higher molecular weight amines which are preferentially soluble in hydrocarbons, the amine can be recovered from the hydrocarbon phase by extraction with aqueous mineral acid and the amine salt can then be decomposed by addition of caustic soda to recover the amine. If desired the catalyst can also be deactivated by substituting alcohol for water. The polyethylene wax produced in the reaction is mainly insoluble in the saturated hydrocarbon reaction medium at room temperature or at moderately elevated temperatures (e.g., 30–60° C.) and hence can be recovered therefrom by filtration. Generally a small amount of lower molecular weight polymer which is soluble in the hydrocarbon solvent will be obtained and it can be recovered therefrom by distillation of the solvent.

In most processes for polymerizing ethylene the average molecular weight of the polymer tends to increase as the reaction pressure increases and decreases with increasing reaction temperature. The present polymerization process is distinguished in that the product molecular weight is substantially independent of pressure or at least not significantly affected thereby, the main effect of pressure variation being to alter the reaction rate. The present polymerization process further is unusual in that the average product molecular weight increases as the reaction temperature is increased. For example, in a series of runs made under the same conditions except at different temperature levels, the following variations in average molecular weight (determined from intrinsic viscosity) were found:

| Temperature, °C.: | Molecular weight |
|---|---|
| 105 | 1650 |
| 115 | 1900 |
| 125 | 2150 |

These data indicate a practically linear increase in average molecular weight as the reaction temperature is increased.

Ethylene polymerizations carried out by the present invention involve two types of reactions, namely, chain propagation whereby the polyethylene chain grows and chain termination whereby growth ceases. These reactions compete with each other and their relative rates determine the molecular weight of the waxy polymer product. The reaction mechanism involved appears to be as follows. The coordination complex between the tertiary amine and LiR is an ionic species and forms a thermally stabilized and soluble amino-lithium cation and a counter carbanion. Chain growth occurs by the insertion of ethylene molecules between these ions. This mechanism predicates that the rate of growth will depend upon ethylene concentration or, in other words, the pressure. On the other hand, termination of the chain growth reaction appears to involve a so-called olefin displacement reaction whereby an ethylene molecule replaces the polyethylene chain associated with the amino-lithium cation and forms a new ionic species with an ethyl group derived from an ethylene molecule becoming the carbanion thereof. Growth can then begin anew with this species to form another polyethylene chain. The cycle thereafter will repeat itself until the catalyst becomes inactive through some other mechanism. The postulated chain transfer mechanism likewise implies that the rate of chain transfer is dependent upon ethylene pressure. Thus the effect of pressure in increasing growth rate is opposed by the pressure effect in expediting the chain transfer reaction. Assuming that these effects on the two opposing reactions are of the same magnitude, it follows that the reaction pressure employed will have no substantial influence on the average molecular weight of the polymer product. As indicated above this is essentially what has been found, thus giving support to the postulated reaction mechanism.

As an illustration of the insignificant effect of pressure on product character, the results of polymerizing ethylene in two runs differing only in the ethylene pressures used (400 v. 800 p.s.i.g.) can be compared. The catalyst system was composed of equimolar amounts of n-butyllithium and sparteine dissolved in octane, the concentration of catalyst complex in solution being 0.03 molar. Reaction temperature in each run was 100° C. Data from these comparative runs are shown in the accompanying table.

| | | |
|---|---|---|
| Ethylene pressure, p.s.i.g. | 400 | 800 |
| Initial polymerization rate, moles $C_2H_4$/mole BuLi/hr | 120 | 275 |
| Number average molecular weight | 1,390 | 1,360 |

The data show that, while increasing the ethylene pressure caused an attendant increase in the polymerization rate, nevertheless the average molecular weight of the wax products were about the same. In other words, the pressure increase accelerated both the growth reaction and the chain transfer reaction to about the same extent, so that the resulting products were essentially alike.

Reactions in accordance with the present invention are, as indicated above, carried out at temperatures exceeding 100° C. If the same kind of catalysts are used for polymerizing ethylene at temperatures substantially below 100° C., distinct differences in what occurs in the reaction system are experienced. While the propagation or growth reaction takes place, the chain transfer reaction does not occur to any substantial extent. This results in products of considerably higher molecular weights (e.g., 10,000 to 300,000), and the desired waxes of the present invention (1000 to 3000 molecular weights) cannot be obtained. Furthermore, the catalyst is poorly utilized in such lower temperature polymerizations, as only a minor proportion of it actually functions to promote chain growth.

The material differences resulting from operating at lower temperatures than those specified for the present invention come about, at least in part, because of insolubility of the ethylene polymer in the reaction solvent at temperatures below 100° C. In such lower temperature operation the catalyst initially is in solution in the solvent. As the polymer chain begins growing from the lithium atom, the polyethylene moiety soon becomes large enough to be insoluble in the solvent and hence it and the attached catalyst moiety precipitate to form a solid phase. In other words a change from homogeneous to heterogeneous catalysis occurs. Evidently propagation of the polymer chain from the catalytic solid continues but the competing chain transfer reaction essentially ceases. Consequently, relatively high molecular weight polymers instead of the lower molecular weight waxes are obtained. In contrast, the reaction system in the present invention remains homogeneous throughout the reaction, since the polyethylene formed does not become insoluble at the relatively high temperatures maintained for the reaction.

The lower temperature reactions above discussed are incapable of forming more than one polymer molecule per atom of lithium, since the chain transfer reaction does not occur. In actual practice even poorer utilization of the catalytic materials is experienced. For example, polymerization of ethylene at about 40° C. and 2600 p.s.i.g., employing a combination of n-butyl-lithium and N,N'-tetramethylethylene diamine as catalyst in n-heptane, gave a polymer of 52,000 molecular weight, but the yield was equivalent to only one molecule of polymer per 20 atoms of lithium.

On the other hand, the catalyst under the elevated temperature conditions of the present process forms a plurality of polymer molecules per atom of lithium and the process is truly catalytic. For instance Examples I and II, infra, show yields of about 6–7 moles of polymer wax per atom of lithium. Except for unknown reactions that cause gradual decline in catalytic activity, the present catalysts would be capable of use indefinitely.

The following examples illustrate the invention more specifically:

Example I

The reactor used was a 300 ml. rocking type autoclave containing a batch of steel balls to provide better agitation. The reactor was flushed with an inert gas and was charged with 100 ml. of purified hexane as solvent, 0.4 g. of n-butyllithium and 4.0 g. of triethylene diamine. The atomic ratio of N:Li was approximately 12:1. The autoclave was rapidly heated to 105° C. while shaking and ethylene was admitted until the pressure was about 850 p.s.i.g. The pressure was maintained at 850 p.s.i.g. throughout the reaction by feeding in ethylene through a pressure regulating valve as the ethylene was consumed. After starting the reaction the rate of ethylene consumption initially declined substantially and thereafter became fairly constant with only a slow decline in catalyst activity. The reaction was allowed to proceed for 30 hours. Although at the end of this time the catalyst still had activity, the reaction was stopped. The reactor was then cooled down and residual gas was vented. Isopropanol was added to destroy the catalyst. The mixture of polymer and hexane solvent, which was a slurry, was filtered to separate the polymer and the latter was washed with isopropanol. There were thus obtained 60 g. of white polyethylene wax which melted at 115–124° C. and had an average molecular weight of about 1700 by intrinsic viscosity. This represents a yield of about 5.7 moles of polymer wax per atom of lithium. Infrared analysis showed that the polymer was unbranched and had a terminal olefinic bond. From the hexane solvent there was also obtained about 6 g. of lower molecular weight soluble polymer by evaporating the hexane.

Example II

In this example a rigid chelating type of amine, namely, the alkaloid sparteine ($C_{15}H_{26}N_2$), was used in preparing the catalyst. The procedure was generally similar to that used in the preceding example but employed a 150 ml. reactor in this case. The catalyst system was prepared using 50 ml. of pure hexane, 0.1 g. of butyllithium and 0.65 ml. of sparteine. The reaction temperature was 115° C. and an ethylene pressure of 800 p.s.i.g. was maintained. During the first one-half hour reaction time the reaction rate declined substantially and then became essentially constant. After a two-hour reaction period the reaction mixture was cooled and quenched with methanol, although at this time the catalytic activity was still quite high. Upon filtering the slurry of wax and hexane 22 g. of white polymer having a melting range of 110–120° C. and a molecular weight of 1900 were obtained. By X-ray diffraction the crystallinity of the wax polymer was found to be greater than 90%, showing that the polymer was essentially unbranched. The yield was about 7.3 moles of wax per atom of lithium. The hexane filtrate contained about 2 g. of lower molecular weight soluble polymer.

Example III

A 300 ml. stainless steel autoclave was charged under inert gas protection with 0.3 g. butyllithium, 1 ml. of N,N'-tetramethylethylene diamine and 125 ml. of isooctane solvent. The autoclave was rapidly heated to 120° C. while shaking and ethylene was applied to maintain a pressure of 600 p.s.i.g. throughout the run. The autoclave was rocked for 1.5 hours at the above temperature and pressure, following which it was cooled to room temperature and vented. The slurry of solid wax product was filtered, and the residue was washed with isopropanol and dried. The yield of waxy polymer was about 26 g. Its molecular weight was determined by intrinsic viscosity to be approximately about 2000 and its melting range was 105–115° C.

When other hydrocarbyl lithium compounds as herein defined are substituted for butyllithium, substantially similar results are obtained. Also when other amines as herein defined are substituted for the amines used in the preceding examples, analogous reactions are obtained. The wax products produced in accordance with the invention have utility as coating agents, as hardeners for paraffin wax, as components in insulating compositions for electric cables or in polishes and the like.

Catalyst systems of the type employed in the present invention have been disclosed and claimed in my United States Patent 3,206,519, issued Sept. 7, 1965, which also discloses and claims their use in telomerizing ethylene with aromatic hydrocarbons to produce alkyl aromatics such as 1-phenylalkanes.

The invention claimed is:

1. Method of producing a polyethylene wax which comprises contacting ethylene in the absence of other olefinic hydrocarbon at a temperature in the range of 101–150° C. with a saturated hydrocarbon solvent containing a catalyst prepared by combining a non-aromatic tertiary amine which contains bridge-head nitrogen or which is a chelating diamine with LiR wherein R is a hydrocarbon radical having 1–30 carbon atoms selected from the group consisting of alkyl, cycloalkyl, aryl, aralkyl and alkenyl, and separating from the reaction mixture straight chain polyethylene wax having an average molecular weight in the range of 1000–3000 and melting point in the range of 100–125° C.

2. Method according to claim 1 wherein said temperature is in the range of 101–130° C. and the ethylene is contacted at a pressure of at least 50 p.s.i.g.

3. Method according to claim 1 wherein said amine is a chelating diamine.

4. Method according to claim 3 wherein said temperature is in the range of 101–130° C. and the ethylene is contacted at a pressure of at least 50 p.s.i.g.

5. Method according to claim 1 wherein said amine contains bridgehead nitrogen.

6. Method according to claim 5 wherein said temperature is in the range of 101–130° C. and the ethylene is contacted at a pressure of at least 50 p.s.i.g.

7. Method according to claim 6 wherein said amine is triethylene diamine.

8. Method according to claim 1 wherein R is an alkyl radical.

9. Method of producing a polyethylene wax which comprises contacting ethylene in the absence of other olefinic hydrocarbon at a pressure in the range of 50–20,000 p.s.i.g. and at a temperature in the range of 101–130° C. with a saturated hydrocarbon solvent containing a catalyst prepared by combining a non-aromatic tertiary amine which contains bridgehead nitrogen or which is a chelating diamine with LiR wherein R is a hydrocarbon radical having 1–30 carbon atoms selected from the group consisting of alkyl, cycloalkyl, aryl, aralkyl and alkenyl, the proportion of said amine to LiR being such that the atomic ratio of N:Li is at least 0.5:1, and separating from the reaction mixture straight chain polyethylene wax having an average molecular weight in the range of 1000–3000 and melting in the range of 100–125° C.

10. Method according to claim 9 wherein said amine is a chelating diamine.

11. Method according to claim 10 wherein said amine is N,N'-tetramethylethylene diamine.

12. Method according to claim 10 wherein said amine is sparteine.

13. Method according to claim 10 wherein said amine is N,N'-tetraalkyl-1,2-diaminocyclohexane.

14. Method according to claim 10 wherein the N:Li ratio is at least 5:1.

15. Method according to claim 9 wherein said amine contains bridgehead nitrogen.

16. Method according to claim 15 wherein said amine is triethylene diamine.

17. Method according to claim 15 wherein the N:Li ratio is at least 5:1.

18. Method according to claim 9 wherein the N:Li ratio is in the range of 0.5:1 to 20:1, and R is an alkyl group having 2–10 carbon atoms and said contacting temperature is in the range of about 105° C. to about 120° C.

19. Method according to claim 18 wherein LiR is butyllithium.

References Cited
UNITED STATES PATENTS 3,451,988  6/1969  Langer _____ 260—94.6

OTHER REFERENCES

Butte: Hydrocarbon Processing, vol. 45, No. 9, September 1966, pp. 277–280.

Renfrew: Polythene, Iliffe and Sons, Ltd., London, 1957, pp. 31–32, 141, 241–242.

Sittig: Polyolefin Resin Processer, Gulf Pub. Co., Houston, Tex., 1961, pp. 119 and 146.

JOSEPH L. SCHOFER, Primary Examiner

E. J. SMITH, Assistant Examiner

U.S. Cl. X.R.

260—683.15